March 17, 1931. D. C. BEIDLER ET AL 1,796,315
TILT BACK FOR CAMERAS AND THE LIKE
Original Filed May 13, 1927 2 Sheets-Sheet 2
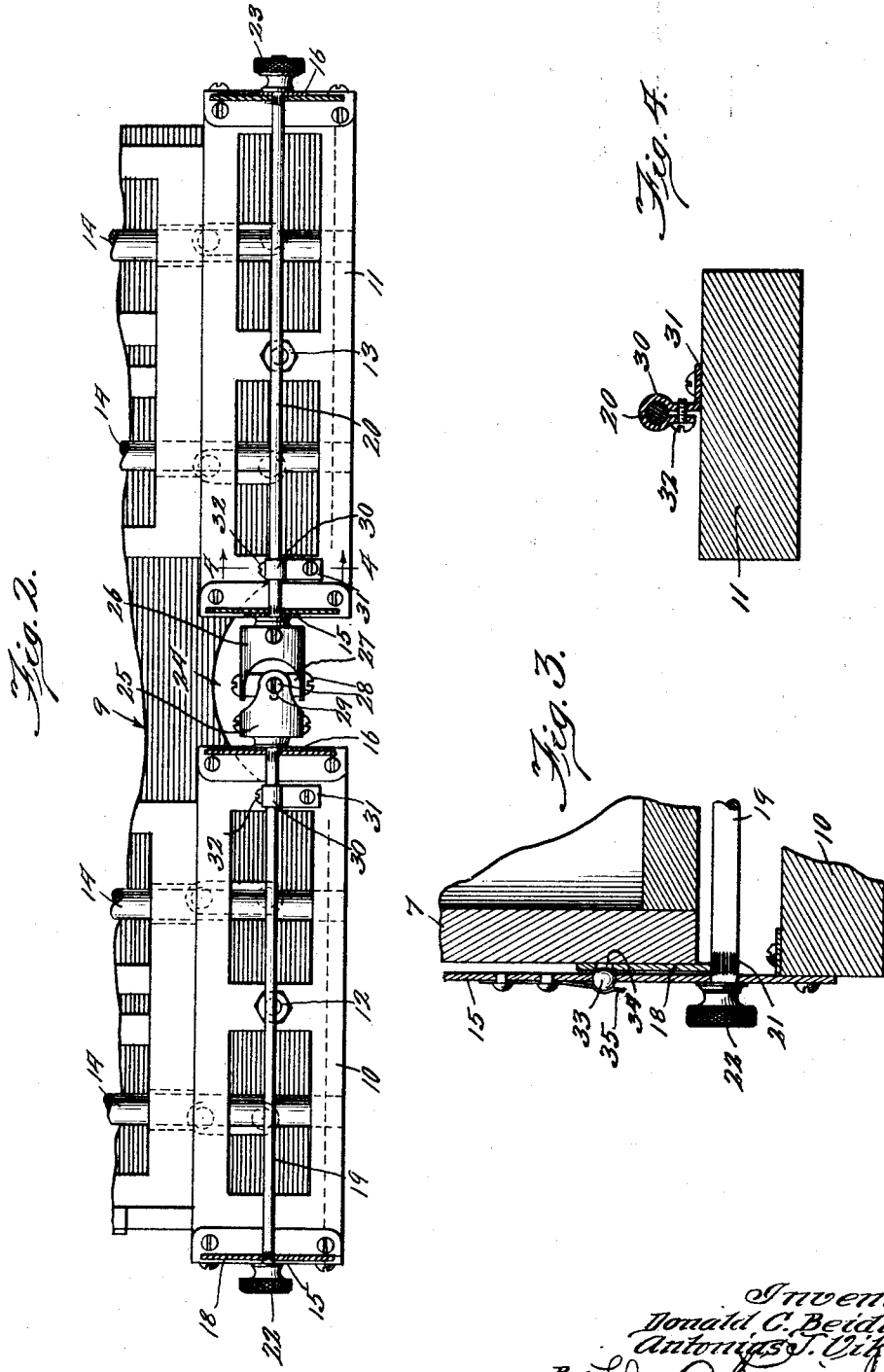
Inventors:
Donald C. Beidler
Antonius J. Viken
By
Atty.

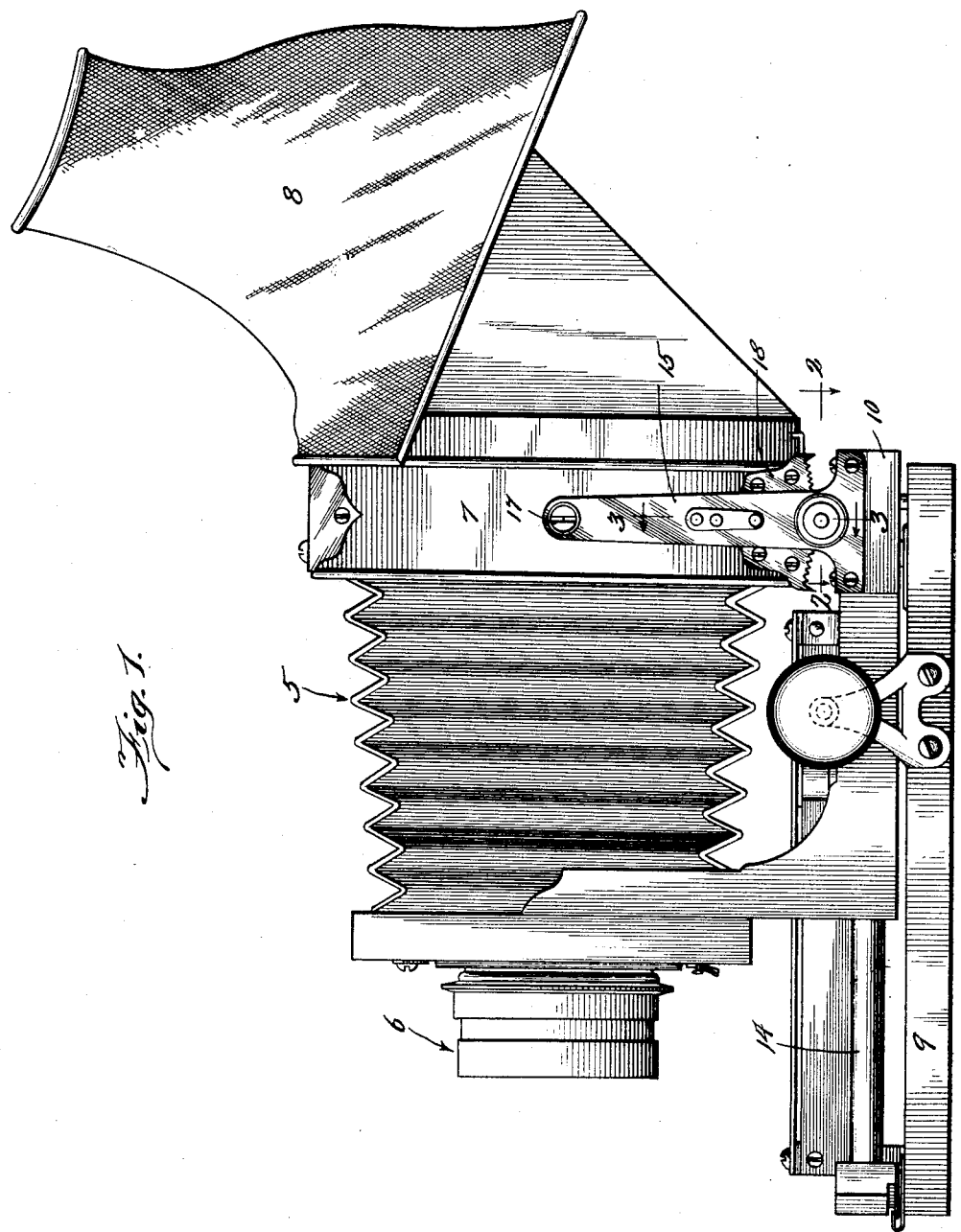

Patented Mar. 17, 1931

1,796,315

UNITED STATES PATENT OFFICE

DONALD C. BEIDLER AND ANTONIUS J. VIKEN, OF CHICAGO, ILLINOIS, ASSIGNORS TO DONALD C. BEIDLER, TRUSTEE

TILT BACK FOR CAMERAS AND THE LIKE

Original application filed May 13, 1927, Serial No. 191,124. Divided and this application filed March 29, 1928, Serial No. 265,805. Renewed August 2, 1930.

This invention has to do with certain improvements in tilt backs for cameras and the like; that is to say it has to do with improvements in the construction of the rear or finder portions of the cameras against which the images are projected. It is necessary to tilt the rear or image portions of the cameras about a horizontal axis in order to bring the upper and lower portions of the image field into proper harmonious focus.

More specifically the features of the present invention have to do with devices of the above character as embodied in double cameras, that is, cameras containing two lenses and two separate image surfaces corresponding thereto. Cameras of this nature are used for various purposes. One such use is disclosed and is covered by Letters Patent of the United States No. 1,528,464, issued to us March 3, 1925, for improvements in portrait cameras. Another such structure is shown in our copending application for Letters Patent of the United States on improvements in cameras and the like, Serial No. 191,124, filed by us May 13, 1927 of which application this application is a division. In both of the aforesaid issued patent and the copending application there are disclosed constructions involving two camera units placed side by side and mounted on a common base whereon they are both adjustably supported. One of said cameras constitutes a finder camera and the other constitutes a true camera within which the picture is taken. The finder camera is provided at its rear end with suitable finder image surfaces whereon the image is projected and brought to focus so that the operator can view the image at all times as projected on said surface. The true camera unit of the said combination is of the same focal characteristics as those of the finder unit; and said true camera is provided in its rear portion with a suitable plate or film holder which is ready for exposure at all times.

In the constructions of the aforesaid patent and copending application the two camera units above referred to are so coordinated that the object is always brought to focus simultaneously on the image surfaces of both units. For this purpose both of said units are harmoniously moved at all times not only as respects their focal axes, but also as respects their focal lengths. That is to say they are always moved in harmony in such a manner that whenever the image surface of the finder unit is in focus on a given object with said object at a given position on the image field the image surface of the true camera is also in focus with said object on the corresponding position of its field. The two camera units are so harmonized in their movements that if the object is movable and the adjustments of the finder unit are changed from time to time so as to maintain the proper focus and image position on the finder field, the true camera follows in harmony and also remains in focus on the same object with the image thereof always in the corresponding position on its field.

Among other things the foregoing harmonizing of movements requires that the focal axes of the two units shall draw towards each other and intersect each other at the position of the object. Accordingly the image finders of the two cameras are somewhat out of parallel and the amount of the deflection from parallelism depends upon the distance of the object from the camera. As the object approaches the camera the angularity between the axes and therefore between the image fields increases.

The harmonious movements of the two units already referred to also require at times that the two fields be tilted harmoniously about horizontal axes. The amount of such tilt must be the same in both units; and this is also true irrespective of the angularity between the focal axes and image surfaces.

The present invention relates particularly to means for so interconnecting the tilt backs of the two units that as the tilt back of the finder unit is tilted to bring and maintain the visable image into desired focus, the tilt back of the true camera will move harmoniously and without further thought or care on the part of the operator. Such harmonious movement will also be produced at all times and irrespective of the angularity between the focal axes.

Another object of the invention relates to the provision of means for retaining both of the tilt backs normally at the true vertical position, and for producing a desired amount of resistance to the adjustment so as to have assurance that the parts will remain in the adjusted position. Other objects and uses will appear from a detailed description of the invention which consists in the features of construction and combinations of parts hereinafter described and claimed.

In the drawings:

Figure 1 shows a side elevation of a camera embodying the features of the present invention, the tilt back of the finder unit standing in its vertical or central position;

Fig. 2 shows a fragmentary horizontal section substantially on the line 2—2 of Fig. 1 looking in the direction of the arrows and it shows the universal joint connection between the two operating shafts of the tilt backs for the two units;

Fig. 3 shows a fragmentary vertical section on the line 3—3 of Fig. 1 looking in the direction of the arrows but on enlarged scale; and Fig. 4 shows a fragmentary detailed section on the line 4—4 of Fig. 2 looking in the direction of the arrows but on enlarged scale.

The finder unit is designated in its entirety by the numeral 5. It embodies the usual lens 6 together with the tilt back 7 at its rear end. This finder unit also includes a suitable finder hood 8 of convenient construction for observing the image produced on the image surface of the finder. The details of this hood constitute no portion of the present application.

The true camera unit does not appear in Fig. 1 inasmuch as it is behind the finder unit and of similar contour but is not provided with the finder hood.

There is a base member 9 upon which both the finder and true camera units are mounted. On the rear portion of this base member there are pivotally mounted the frames 10 and 11 for the finder and true camera units, said frames being pivoted to the base on the pivotal points 12 and 13 respectively. These frames have the forwardly projecting portions 14 on which the front portions of the camera units are slidably carried. There is also provided means for working the frames 10 and 11 on their pivotal points 12 and 13 so as to maintain their focal axes always in focus on the object. The construction of such operating mechanism constitutes the subject matter of the aforesaid application Serial No. 191,124 of which this is a division.

Reaching upwardly from each of the frames 10 and 11 is a pair of bracket arms 15 and 16. The corresponding tilt back is pivoted between the upper ends of the arms 15 and 16 of such frame as shown at 17 in Fig. 1. Thus there are established horizontal tilting axes for the tilt backs, and said tilting axes pass substantially through the central portions of their respective tilt backs.

Secured to the lower edge of each side of each tilt back there is a small rack bar 18 (best shown in Fig. 1), having its lower rack edge formed concentric with the axis of tilt. Journaled in the side plates 15 and 16 of the two frames 10 and 11 are the shafts 19 and 20 respectively. These shafts extend across their respective frames just below the positions of the rack bars 18; and said shafts are provided in their end portions with pinions or teeth 21 (best shown in Fig. 3) which mesh with the corresponding rack bars. Thus by rotating the shafts 19 and 20 the two tilt backs are worked on their axes.

At their outer ends the shafts 19 and 20 are provided with knurled finger pieces 22 and 23 respectively so that said shafts can be conveniently turned for the adjustment.

The inner or adjacent ends of the shafts are connected together by a universal joint 24. The same includes the sections 25 and 26 on the two shafts 19 and 20 respectively. Said sections are joined together by the union block 27 to which the sections are pin connected by the screws 28. These connections are relatively loose in an axial direction by providing the universal joint sections 25 and 26 with slots 29 which are axially elongated. By this means the necessary amount of freedom of movement is established without however allowing any material amount of angular play between the two sections. This axial freedom of movement also allows the shafts 19 and 20 to move endwise towards and from each other a sufficient distance to take care of the changing positions of the shafts due to rocking of the frames 10 and 11 on their pivotal points.

By the foregoing means it will be seen that upon turning either one of the shafts both of the tilt backs will be harmoniously rocked on their horizontal axes; and such adjustment will be effected at all times in the proper manner and irrespective of the exact positions of adjustment of the two camera units.

In order to impose a slight amount of resistance to the rotation of the two shafts we have provided a clip 30 embracing each of said shafts and having a base portion 31 which is secured to the corresponding frame 10 or 11 as the case may be. Each of these clips 30 substantially embraces its shaft and may be tightened up by a screw 32 so as to give the desired amount of frictional resistance. This resistance however is not enough to interfere with a proper freedom of adjustment from time to time by the operator.

In order to give an indication as to the condition of adjustment of the tilt backs into the true vertical position we have provided a ball 33 in one of the arms (15), which ball may be pressed partially into a socket 34 of the corresponding rack bar plate 18. Such result is produced by a leaf spring 35 secured to the arm 15 as best shown in Fig. 3. This spring pressed ball will not seriously interfere with the tilting movements but it will give a click to indicate to the operator the instant when the tilt back stands in the vertical position.

While we have herein shown and described only a single embodiment of the features of our present invention still we do not intend to limit ourselves thereto except as we may do so in the claims.

We claim:

1. In a camera of the type described the combination of a platform, a pair of companion rear frame members pivotally mounted on the rear portion thereof, upstanding brackets on said frame members, camera boxes pivotally mounted on said brackets and capable of tilting movement about horizontal axes, shafts journaled on the frame members aforesaid, rack and pinion connections between said shafts and the lower portions of the camera boxes, a universal joint connection between the inner ends of the two shafts aforesaid, including slip connections in said universal joint permitting slight axial adjustments while maintaining the two shafts in angular relation at all times, whereby both of said shafts may be rotated simultaneously to adjust the tilt of both boxes simultaneously, and suitable lens and bellows elements in conjunction with said boxes substantially as described.

2. In a camera of the type described the combination of a platform, a pair of companion rear frame members pivotally mounted on the rear portion thereof, slide members slidably mounted with respect to each of said frame members, means for moving the slide members back and forth with respect to the frame members conjointly, camera boxes pivotally mounted with respect to the frame members and adapted to swing about horizontal axes, common means for simultaneously swinging both of the camera boxes conjointly, and slip connections in said common means permitting such action irrespective of the positions of the rear frame members on their pivotal mountings on the platform, substantially as described.

3. In a camera of the type described the combination of a platform, a pair of companion rear frame members pivotally mounted on the rear portion thereof, means for turning said rear frame members conjointly, camera boxes pivotally mounted with respect to the frame members and adapted to swing about horizontal axes, common means for simultaneously swinging both of the camera boxes conjointly and slip connections in said common means permitting such action irrespective of the positions of the rear frame members or their pivotal mountings on the platform, substantially as described.

DONALD C. BEIDLER.
ANTONIUS J. VIKEN.